United States Patent [19]

Regreny et al.

[11] 4,082,601
[45] Apr. 4, 1978

[54] PROCESS FOR FABRICATING LI(NBTA)O₃ FILMS ONTO LITHIUM TANTALATE SINGLE CRYSTALS

[76] Inventors: André Maurice Regreny, Parc ar Croas, Rue Albert Camus; Michel Xavier Passaret, 20, Rue Pierre le Goffic, both of Perros Guirec, France, 22700; Loic André Rivoallan, Tossen Hat, Kermoroc'h, France, 22140

[21] Appl. No.: 652,392

[22] Filed: Jan. 26, 1976

[30] Foreign Application Priority Data

Feb. 11, 1975 France .................................. 75 04768

[51] Int. Cl.² ...................... B01J 17/04; C01D 15/00
[52] U.S. Cl. .......................... 156/623 R; 156/DIG. 71; 156/DIG. 87; 427/126; 423/593
[58] Field of Search ............... 156/DIG. 71, 620–624, 156/87; 427/126, 162; 423/593

[56] References Cited

U.S. PATENT DOCUMENTS

| | | | |
|---|---|---|---|
| 2,954,300 | 9/1960 | Triebwasser | 156/DIG. 71 |
| 3,428,438 | 2/1969 | Andres | 156/DIG. 71 |
| 3,440,025 | 4/1969 | Laudise | 156/DIG. 71 |
| 3,533,755 | 10/1970 | Ballmas | 156/DIG. 71 |
| 3,634,044 | 1/1972 | Parker | 156/621 |
| 4,001,076 | 1/1977 | Robinson et al. | 156/DIG. 71 |

FOREIGN PATENT DOCUMENTS 47-21219  6/1972  Japan ........................... 156/DIG. 71

OTHER PUBLICATIONS

Miyazawa, Chem. Abs., vol. 79, p. 384, No. 97756t (1973), *Growth of Li Niobate . . . Waveguides.*

Harendza-Harinxna, Growing of Potassium . . . Crystals, Western Electric Tech. Digest, No. 9 (1–1968), pp. 33 & 34.

*Primary Examiner*—Michael F. Esposito
*Attorney, Agent, or Firm*—Charles A. Laff; J. Warren Whitesel; Howard B. Rockman

[57] ABSTRACT

The inventive process produces a Li(NbTa)O₃ single-domain, single-crystalline film on a lithium tantalate single-crystal. The film is grown on the lithium tantalate, single-crystal by hydrothermal synthesis wherein the alkaline solution is heated to a temperature which is lower than the Curie point temperature of lithium tantalate. The mother material is a mixture of tantalum and lithium salts.

The resulting film may guide several modes of light, and possibly modulate them.

7 Claims, 2 Drawing Figures

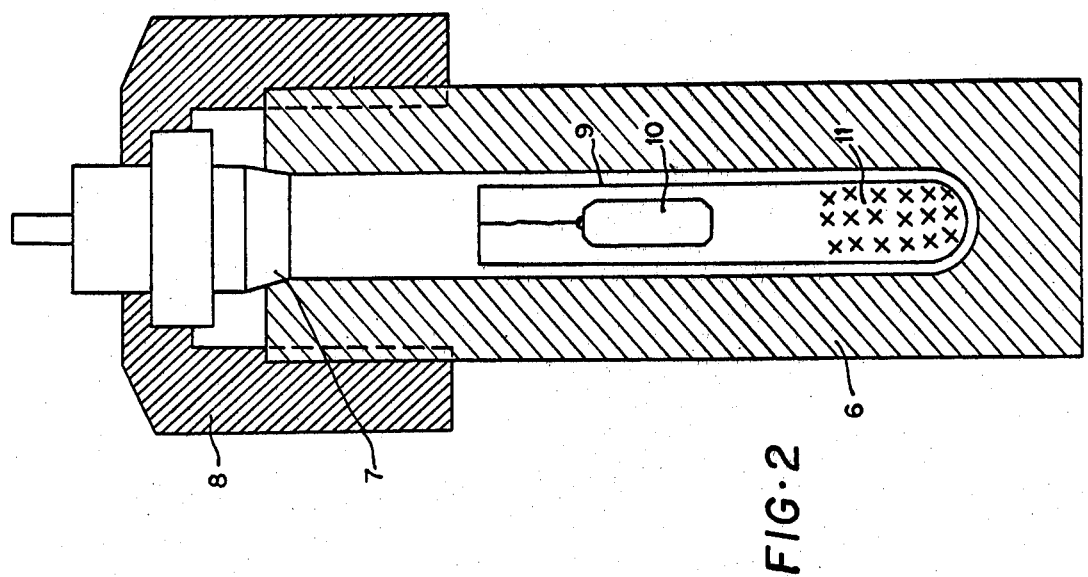
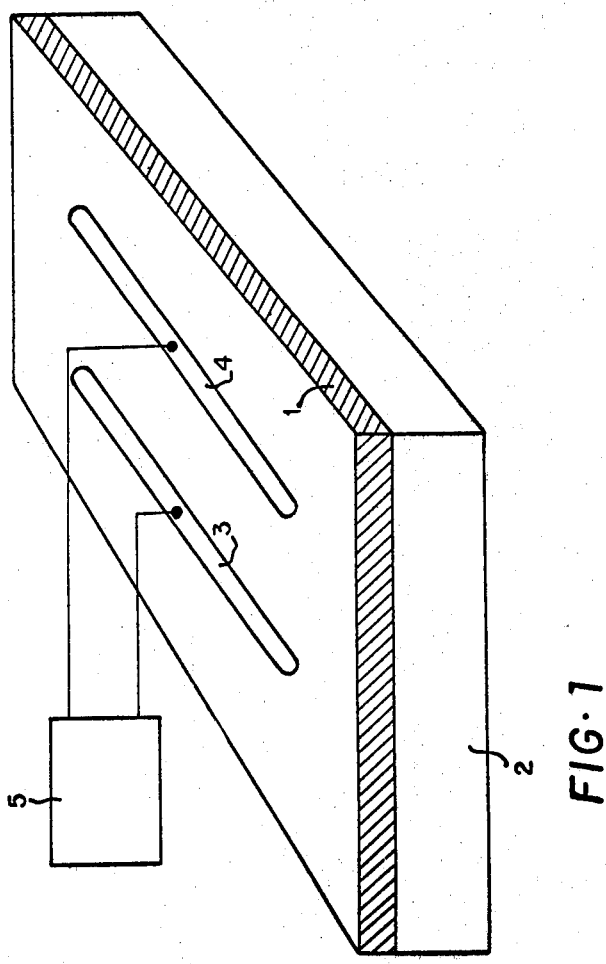

PROCESS FOR FABRICATING LI(NBTA)O₃ FILMS ONTO LITHIUM TANTALATE SINGLE CRYSTALS

The present invention relates to a process for growing Li(TaNb)O₃ single-crystalline films, making it possible for them to guide and, possibly, to modulate several light modes.

Studies have shown that lithium metatantalate LiTaO₃ may easily be used for light modulation due to electro-optical effect, at ambient temperatures. Thus, light modulators including LiTaO₃ single crystals have already been commercialized by Japanese firms.

Usually a light waveguide is made of a film that is transparent at the utilized light wavelength, and is deposited on a substrate. Light guiding implies a total internal reflection at film-surface interface, i.e. film refractive index is higher than substrate refractive index. Moreover, film thickness and refractive index define light propagtion modes throughout the film.

Finally, in view of the numerous applications expected in the field of telecommunications and data transmissions, integrated devices that are capable of both guiding and modulating light have considerable importance. In order that a guide may be utilized as a modulator, it would, for instance, be made of a material having electro-optical properties, such as lithium metatantalate.

Such guides have already been produced through various methods. More particularly an article entitled "Diffusion kinetics and optical wave guiding properties of out diffused layers in lithium niobate and lithium tantalate" by J. R. Carruthers, I. P. Kaminow and L. W. Stulz, published in the Review "Applied Optics," Vol. 13, No. 10, October 1974, describes a process for producing light-guide-modulator by out-diffusing Li₂O from LiTaO₃ single-crystalline substrate. Lithium vacancies are generated within tantalate by heating it to at about 1100° C, under vacuum conditions. Treatment at high temperature, above the Curie point of lithium tantalate, may vary from 590° C to 620° C, as a function of the ration of the number of lithium atoms to that of tantalum atoms. The crystal becomes a polydomain. For efficiently utilizing of ferro-electric properties of a crystal, such a crystal must be single-domain crystal. An additional heating process, under an electric field is then necessary to restore the single-domain condition.

In the article "Growth of LiNbO₃ single crystal film for optical waveguides" by S. Miyazawa, published in the Review "Applied Physic Letters", Vol. 23, No. 4, August 15, 1973, a lithium niobate layer is melted on the surface of a lithium tantalate crystal. Melting is followed by epitaxial growth at about 1250° C. This method has the same drawback as that previously mentioned regarding the high temperature involved in the treatment.

It has also been proposed to perform metal electrodiffusions and diffusions in tantalate crystal. Metal atoms occur in free vacancies existing in the structure of the lithium tantalate crystal. That process still involves high temperature treatment, above Curie point of tantalate, and has the mentioned drawbacks. Moreover, there is no actual substitution of metal for tantalum.

An object of the present invention is to provide a process for manufacturing a guide on the surface of a single-domain single-crystal of lithium tantalate, which guide does not have hereabove mentioned drawbacks.

Another object of this invention is to provide a process for manufacturing the guide-substrate interface with a varying uniform refractive index that is a graded refractive index.

Yet another object of this invention is to provide a process for manufacturing a guide, wherein there is actually substitutaion of niobium for tantalum.

Then, it must be noted that the physical and chemical structure of the produced optical guide is different from the previously mentioned guides.

Still another object of this invention is to provide a process of manufacture which makes it possible to easily control, in a reproducible manner, both the thickness and refractive index of the optical guide.

According to a feature of this invention, a process for manufacturing of Li(NbTa)O₃ films on lithium tantalate single-crystals grows the film on a lithium tantalate, single-crystal by a hydrothermal synthesis. The alkaline solution is heated to a temperature lower than the Curie point of lithium tantalate single-crystal. The mother material is a mixture of tantalum and niobium salts.

Other features of the present invention will appear more clearly from the following description of a preferred embodiment, in conjunction with the accompanying drawings, wherein:

FIG. 1 is a schematic, perspective view of a guide formed on a substrate made of lithium tantalate, and FIG. 2 is a cross-sectional view of an apparatus or autoclave for a hydrothermal growth of a film, according to this invention.

FIG. 1 shows a Li(NbTa)O₃ film 1 grown on a substrate 2 made of lithium tantalate, LiTaO₃. The substrate 2 is a single-domain single-crystal. In the film 1, there is a substitution of niobium for tantalum which makes the film refractive index $n_1$ higher than refractive index $n_2$ of the substrate. Light waves are propagated in the guide 1 in a known manner, which is similar to a propagation of electro-magnetic waves in a conventional metal waveguide. By way of example, two metal electrodes 3 and 4 are here shown as having been deposited onto the free film surface in a direction parallel to that of light-wave propagation. An electric field is generated by electrodes 3 and 4, which are connected to any suitable voltage source 5. The variation in this electric field varies the ferro-electric characteristics of the single-crystalline film, which results in varying the refractive index and consequently in varying transmitted modes. Otherwise the electrodes 3 and 4 makes it possible for the film 1 to modulate the transmitted light.

The autoclave, shown in FIG. 2, comprises a body 6, an obturator 7 and a closing bolt 8 heating collars and pressure channels (not shown to simplify the drawing) are also provided. Inside the cavity formed by the body 6 and the obturator 7, a capsule 9 made of a noble metal, for instance platinum, is housed. Inside the upper portion of capsule 9, a LiTaO₃ single-crystal 10 hangs on appropriate means (not shown). The crystal has previously been polished on at least one face which, for instance contains the optic light propagation axis. In and in the under portion of capsule 9, there is an alkaline solution and the mother material, containing tantalum and niobium.

A complete description of the hydrothermal synthesis method is described in the book entitled "The growth of single crystals" by R. A. Landise, published by Prentice Hall. Inc. in 1970. Thus, it will only be recalled here the Landise that method involves properties of aqueous solutions in hypercritic condition in order to produce chemical reactions; in particular, the conditions involve higher rates of solubility than those existing in normal conditions. In the described embodiment, the aqueous solution is the alkaline solution, preferably a LiOH 4.N lithia solution. The mother material may be composed of a sufficiently large quantity or amount of powder of $Nb_2O_5$ and $LiTaO_3$.

The closed autoclave is heated to 370° C for example. That is a temperature lower than the Curie point temperature of lithium tantalate. Indeed a temperature gradient is established from the under portion of capsule 9 to upper portion thereof. In the heater under portion, the solution is becoming saturated. Convection moves it up to the colder upper portion where it becomes oversaturated. Then $Li(NbTa)O_3$ is deposited on the single-crystal 10 which is serving as a seed. The solution moves down, is heated again and becomes saturated again. As the treatment is taking place at 370° C, when the choosen single-crystal 10 is a single-domain crystal, the epitaxially deposited film is obviously also a single-domain film.

Optical characteristics of the guide, that is the film, are determined by thickness and refractive index thereof. In order to vary those characteristics, one or more of the following parameters may be controlled: reaction temperature, that must be held under the Curie point; the ratio of the amount of niobium to the amount of tantalum in the initial solution; and time duration of the reaction. The pressure inside capsule 9 is determined by the initial solution filling. The alkaline concentration may also enable a control over the characteristics. It should be noted that, in the described example, the pressure was of about 1200 bars. Experiments have shown that film thickness increases with time, which is normal. For a given time duration it increases with temperature. The refractive index increases with niobium/tantalum ration. Also, it has been shown that a good reproducibility is obtained by simply controlling those parameters.

Finally, from a lithium tantalate seed surface to film surface, the concentration of niobium, that is first null, quadratically increases to rapidly become constant. Thus, at the interface there is no abrupt variation for the refractive index. As a function of the initial niobium/tantalum ration in the mother material, the concentration of niobium may be varied from 0 to 100%, which permits a selection of the refractive index within a very broad range. Thus either single-mode or multimode guides may be produced.

Still to be noted, the film may be obtained regardless of the orientation of the single-crystal face on which the reaction is implemented. Particularly, it was possible to form a film wherein five modes could be guided, such a film being about 10 microns thick and containing 80% of niobium at its surface.

Moreover, another advantage of the process according to this invention, utilizes the method of hydrothermal synthesis. This results from the fact that tens, hundreds, or even thousands of chips of $LiTaO_3$ might be processed at the same time. That is, mass production of such guides may be expected with identical characteristics and a good reproducibility.

The mother material may, for instance, contain $LiTaO_3$ and $Nb_2O_5$, or $TaO_5$ and $LiNbO_3$, or even a mixture of oxides of Nb and Ta.

It will also be an noted that there may be ionic exchange between $Ta^{5+}$ and $Nb^{5+}$ in the vicinity of the seed surface. Such an exchange contributes to an increase the thickness of the produced layer by diffusing ion $Nb^{5+}$ into the seed.

While the principles of the present invention have hereabove been described in relation with a specific embodiment, it must be clearly understood that the said description has only been made by way of example and not as a limitation on the scope of this invention.

What is claimed is:

1. A process of manufacturing single crystal $Li(NbTa)O_3$ films on lithium tantalate single-crystals, wherein said film is grown in a pressure of about 1200 bars on the said lithium tantalate single-crystal by hydrothermal synthesis wherein the alkaline solution is heated to a temperature in the order of approximately 370° C. which is lower than the Curie point of lithium tantalate single-crystal, the mother material being a mixture of tantalum and niobium salts.

2. A process of manufacture according to claim 1, wherein the alkaline is a lithia solution.

3. A process of manufacture according to claim 1 wherein tantalum salt is lithium tantalate and niobium salt is niobium pentoxide $Nb_2O_5$.

4. A process of manufacture according to claim 1 wherein tantalum salt is tantalum pentoxide and niobium salt is lithium niobate $LiNbO_3$.

5. A process of manufacture according to claim 1 wherein both the tantalum and niobium salts are oxides of those elements.

6. A process of manufacture according to claim 1 wherein the film thickness is determined as a function of the temperature and time duration of the reaction.

7. A process of manufacture according to claim 1 wherein a refractive index of the film is predetermined as a function of the niobium/tantalum ratio in the initial mother material.

* * * * *